Patented Aug. 15, 1933

1,922,923

UNITED STATES PATENT OFFICE 1,922,923

MANUFACTURE OF CAOUTCHOUC-LIKE BODIES

Jean Baer, Uster, Switzerland

No Drawing. Application November 1, 1928, Serial No. 316,627, and in Germany June 29, 1928

6 Claims. (Cl. 260—6)

In my pending U. S. patent application Ser. No. 221,399, filed September 22, 1927, I have described a process for the manufacture of caoutchouc-like bodies consisting in causing alkali- or earth-alkali sulphides to react upon halogen derivatives of the saturated hydrocarbons $C_nH_{2n+2}$.

Now, I have found that similar caoutchouc-like bodies are obtained if di-halogenated unsaturated hydrocarbons are heated with an alkali or alkali-earth metal mono- or polysulphide solution.

The following examples illustrate the invention, the parts being by weight.

(1) 5 parts of isoprenedibromide are heated with 150 parts of an ordinary commercial lime sulphur solution or a calcium polysulphide solution during one hour to about 80° C. There is formed by this reaction a tough product of polymerization rich in sulphur, which is completely insoluble in water and also difficulty soluble in many organic solvents.

(2) 10 parts of butadiendichloride and 300 parts of a 15 percent solution of potassium sulphide are heated together during 1½ hours to 90° C. A tough caoutchouc-like product of polymerization is precipitated which can be worked up to any caoutchouc substitution product.

The above process is applicable to any di-halogenated unsaturated hydrocarbons. Polysulphides of alkali metals and alkali-earth metals are preferable for the reaction therewith.

What is claim is:

1. A process for the manufacture of caoutchouc-like bodies, consisting in heating a dihalogen derivative of a hydrocarbon selected from the unsaturated hydrocarbon group consisting of isoprene and butadien at temperatures of about 80 to about 90° C. with an alkali-forming metal polysulphide solution.

2. A process for the manufacture of caoutchouc-like bodies, consisting in heating a dihalogen derivative of a hydrocarbon selected from the unsaturated hydrocarbon group consisting of isoprene and butadien at temperatures of about 80 to about 90° C. with a solution of an alkali metal polysulphide.

3. A process for the manufacture of caoutchouc-like bodies, consisting in heating a dihalogen derivative of a hydrocarbon selected from the unsaturated hydrocarbon group consisting of isoprene and butadien at temperatures of about 80 to about 90° C. with a solution of an alkali-earth metal polysulphide.

4. A process for the manufacture of caoutchouc-like bodies, consisting in heating di-halogenated isoprene at a temperature of about 80° C. with an alkali-forming metal polysulphide solution.

5. A process for the manufacture of caoutchouc-like bodies, consisting in heating di-halogenated isoprene at a temperature of about 80° C with a solution of an alkali-earth metal polysulphide.

6. A process for the manufacture of caoutchouc-like bodies, consisting in heating di-halogenated butadien at a temperature of about 90° C. with a solution of an alkali-metal polysulphide.

JEAN BAER.